US006239678B1

(12) United States Patent
Yamauchi

(10) Patent No.: US 6,239,678 B1
(45) Date of Patent: May 29, 2001

(54) STARTER MAGNET SWITCH

(75) Inventor: Hayato Yamauchi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/609,922

(22) Filed: Jul. 5, 2000

(30) Foreign Application Priority Data

Jan. 18, 2000 (JP) ................................................ 12-009017

(51) Int. Cl.[7] ................................................ H01M 67/02
(52) U.S. Cl. ............................................ 335/126; 335/131
(58) Field of Search ..................................... 335/126, 131

(56) References Cited

U.S. PATENT DOCUMENTS 5,214,401 * 5/1993 Kimuara et al. .................... 335/126
5,703,551 * 12/1997 Lefebvre et al. .................... 335/126
5,917,394 * 6/1999 Fuchs .................................. 335/229

FOREIGN PATENT DOCUMENTS 11-182390 7/1999 (JP) .

* cited by examiner

*Primary Examiner*—Lincoln Donovan
(74) *Attorney, Agent, or Firm*—Sughrue, Mion, Zinn, Macpeak & Seas, PLLC

(57) ABSTRACT

In a starter magnet switch, a stopper having a pair of semicircular pieces regulates the movement of a movable contact in an axial direction of a rod. The pair of semicircular pieces are mounted on the mounting grooves of the rod so as to surround the rod in a state where the semicircular pieces are opposed to each other. Projections that regulate the relative axial movement of the stopper with respect to the cover, are disposed on a cover body.

10 Claims, 6 Drawing Sheets

STARTER MAGNET SWITCH

BACKGROUND OF THE INVENTION

1. Field of the Invention

The present invention relates to a starter magnet switch that permits/inhibits the supply of electric power to a starter motor.

2. Description of the Related Art

FIG. 11 is a cross-sectional view showing a conventional starter magnet switch, for example, as disclosed in Japanese Patent Application Laid-Open No. Hei 11-182390. In the figure, a switch case 2 is connected to one end portion of a cylindrical solenoid case 1. A pair of fixed contacts 3 and 4 are fixed at a given interval within the switch case 2. A pair of conductors 5 and 6 are electrically connected to the fixed contacts 3 and 4, respectively.

A cylindrical bobbin 7 is accommodated within the solenoid case 1. A coil 8 is held on the outer peripheral portion of the bobbin 7. A fixed iron core 9 is fixed within the solenoid case 1. The fixed iron core 9 includes a flange portion 9*a* which is in contact with an end surface of the bobbin 7 at the switch case 2 side and a cylindrical portion 9*b* which is inserted into the bobbin 7.

A movable iron core 10 that slidably reciprocates is inserted into the bobbin 7. One end portion of the movable iron core 10 is brought in or out of contact with the end surface of the cylindrical portion 9*b*. Also, the other end portion of the movable iron core 10 projects externally from the solenoid case 1. An opening spring 11 that urges the movable iron core 10 in a direction where the movable iron core 10 is dissociated from the fixed iron core 9 is disposed between the other end portion of the movable iron core 10 and the solenoid case.

One end portion of the movable iron core 10 is fixed with a rod 12 that extends axially of the movable iron core 10 and reciprocates together with the movable iron core 10. The rod 12 includes a large-diameter portion 12*a* fixed onto the movable iron core 10 and a small-diameter portion 12*b* adjacent to the large-diameter portion 12*a*.

FIG. 12 is a front view showing a leading portion of the rod 12 shown in FIG. 11, and FIG. 13 is a cross-sectional view taken along a line XIII—XIII of FIG. 12. The small-diameter portion 12*b* of the rod 12 is equipped with a holding member 13 that can reciprocate in an axial direction of the small-diameter portion 12*b*. The holding member 13 includes a flange portion 13*a* and a cylindrical portion 13*b*. A ring-shaped holding plate 14 is abutted against an end surface of the cylindrical portion 13*b*.

A plate-shaped movable contact 15, which is brought in or out of contact with the pair of fixed contacts 3 and 4, is supported by the rod 12. The movable contact 15 is disposed between the flange portion 13*a* and the holding plate 14. A contact spring 16 that urges the movable contact 15 toward the fixed contacts 3 and 4 is disposed between the large-diameter portion 12*a* of the rod 12 and the holding member 13.

An annular mounting groove 12*c* is defined in the outer periphery of the leading portion of the small-diameter portion 12*b*. The mounting groove 12*c* is equipped with a metallic C-shaped stopper (stopper ring) 17 that regulates the movement of the movable contact 15 toward the axial direction of the rod 12. The stopper 17 is hardened by quenching or the like. A washer 18 is inserted into the small-diameter portion 12*b* between the stopper 17 and the holding plate 14.

A cover 19 is made of a metal softer than that of the stopper 17 and inserted into the small diameter portion 12*b* between the washer 18 and the stopper 17. The cover 19 includes a ring portion 19*a* that intervenes between the stopper 17 and the washer 18 and a cover body 19*b* that surrounds the stopper 17. The cover body 19*b* is provided with a plurality of caulking portions 19*c* that are engaged with the stopper 17. With this structure, the stopper 17 is prevented from being disengaged from the small-diameter portion 12*b*.

In the conventional starter magnet switch structured as described above, because no means are provided for sufficient regulating the movement of the stopper 17 radially of the rod 12, there is a fear that the stopper 17 will move radially due to vibrations or the like. Then, where the stopper 17 is repeatedly moved, it will come into contact with the cover 19 made of soft iron material, to wear the cover 19 worn from the inside. As a result, there is a fear that the cover 19 may be damaged by use over a long period of time, and the stopper 17 may be come disengaged due to the damaged cover 19.

Also, because the caulking portions 19*c* are formed in the cover body 19*b*, there is a fear that portions 19*d* between the respective caulking portions 19*c* (FIG. 12) will expand radially, shortening the creepage distances between the fixed contacts 3, 4 as well as the movable contact 15 and the cover body 19*b* with the result that the cover body 19*b* and the fixed contacts 3, 4 as well as the movable contact 15 are short-circuited.

SUMMARY OF THE INVENTION

The present invention has been made to solve the above-mentioned problems, and therefore has an object to provide a starter magnet switch with which movement of the stopper can be more surely prevented, thereby preventing the cover from being damaged and the stopper from being disengaged. Further, with this starter magnet switch, short-circuits due to the cover can also be prevented.

To this end, according to one aspect of the present invention there is provided a starter magnet switch, comprising: a fixed iron core; a movable iron core which is allowed to reciprocate in a direction in which the movable iron core is brought in or out of contact with the fixed iron core; an opening spring which urges the movable iron core in a direction where the movable iron core is dissociated from the fixed iron core; a coil which moves the movable iron core by excitation in a direction where the movable iron core is brought in contact with the fixed iron core against the opening spring; a rod which includes an annular mounting groove defined in an outer periphery of a leading portion thereof and reciprocates together with the movable iron core; a plurality of fixed contacts disposed at given intervals; a movable contact which is supported by the rod in a state where the movable contact can reciprocate in an axial direction of the rod, which is brought in or out of contact with the fixed contacts by the reciprocation of the rod, and which electrically connects/disconnects the fixed contacts; a contact spring which is disposed between the rod and the movable contact and urges the movable contact toward the fixed contacts; a stopper which includes a pair of semicircular pieces which are semi-annular and mounted on the mounting grooves so as to surround the rod in a state where the semicircular pieces are opposed to each other, and which regulates the movement of the movable contact in the axial direction of the rod; and a cover which includes a ring portion disposed between the movable contact and the stopper and a cylindrical cover body that surrounds the stopper, and which prevents the stopper from being disengaged from the rod.

According to another aspect of the present invention, there is provided a starter magnet switch, comprising: a fixed iron core; a movable iron core which is allowed to reciprocate in a direction in which the movable iron core is brought in or out of contact with the fixed iron core; an opening spring which urges the movable iron core in a direction where the movable iron core is dissociated from the fixed iron core; a coil which moves the movable iron core by excitation in a direction where the movable iron core is brought in contact with the fixed iron core against the opening spring; a rod which includes an annular mounting groove defined in an outer periphery of a leading portion thereof and reciprocates together with the movable iron core; a plurality of fixed contacts disposed at given intervals; a movable contact which is supported by the rod in a state where the movable contact can reciprocate in an axial direction of the rod, which is brought in or out of contact with the fixed contacts by the reciprocation of the rod, and which electrically connects/disconnects the fixed contacts; a contact spring which is disposed between the rod and the movable contact and urges the movable contact toward the fixed contacts; a stopper which is mounted on the mounting grooves, and regulates the movement of the movable contact in the axial direction of the rod; and a cover which includes a ring portion disposed between the movable contact and the stopper and a cylindrical cover body that surrounds the stopper, and prevents the stopper from being disengaged from the rod; wherein projections that regulate the relative axial movement of the stopper with respect to the cover are disposed inside of the cover body.

According to a still further aspect of the present invention, there is provided a starter magnet switch, comprising: a fixed iron core; a movable iron core which is allowed to reciprocate in a direction in which the movable iron core is brought in or out of contact with the fixed iron core; an opening spring which urges the movable iron core in a direction where the movable iron core is dissociated from the fixed iron core; a coil which moves the movable iron core by excitation in a direction where the movable iron core is brought in contact with the fixed iron core against the opening spring; a rod which includes an annular mounting groove defined in an outer periphery of a leading portion thereof and reciprocates together with the movable iron core; a plurality of fixed contacts disposed at given intervals; a movable contact which is supported by the rod in a state where the movable contact can reciprocate in an axial direction of the rod, which is brought in or out of contact with the fixed contacts by the reciprocation can the rod, and which electrically connects/disconnects the fixed contacts; a contact spring which is disposed between the rod and the movable contact and urges the movable contact toward the fixed contacts; a stopper which is mounted on the mounting grooves, and regulates the movement of the movable contact in the axial direction of the rod; and a cover which includes a ring portion disposed between the movable contact and the stopper and a cylindrical cover body that surrounds the stopper, and which prevents the stopper from being disengaged from the rod; wherein the entire periphery of an end portion of the cover body is uniformly bent radially inward.

BRIEF DESCRIPTION OF THE DRAWINGS

These and other objects, features and advantages of this invention will become more fully apparent from the following detailed description taken with the accompanying drawings in which.

DETAILED DESCRIPTION OF THE PREFERRED EMBODIMENTS

Now, a description will be given in more detail of preferred embodiments of the present invention with reference to the accompanying drawings.

Embodiment 1

Figure 1:
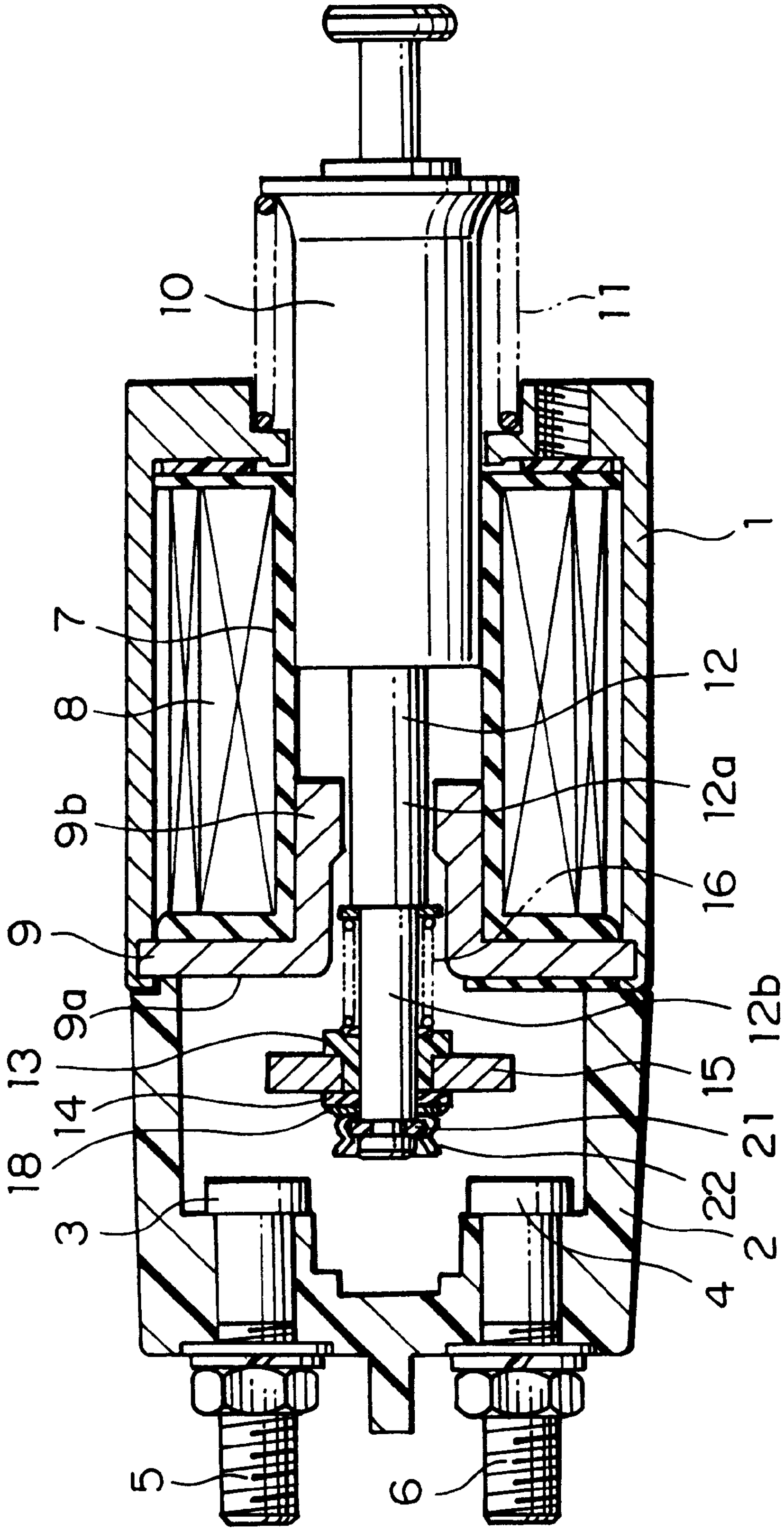
FIG. 1 is a cross-sectional view showing a starter magnet switch in accordance with a first embodiment of the present invention.

FIG. 1 is a cross-sectional view showing a starter magnet switch in accordance with a first embodiment of the present invention. In the figure, a switch case 2 is connected to one end portion of a cylindrical solenoid case 1. A pair of fixed contacts 3 and 4 are fixed at a given interval within the switch case 2. A pair of conductors 5 and 6 are electrically connected to the fixed contacts 3 and 4, respectively.

A cylindrical bobbin 7 is accommodated within the solenoid case 1. A coil 8 is held on the outer peripheral portion of the bobbin 7. A fixed iron core 9 is fixed within the solenoid case 1. The fixed iron core 9 includes a flange portion **9*a* which is in contact with an end surface of the bobbin 7 at the switch case 2 side and a cylindrical portion 9*b* which is inserted into the bobbin 7**.

A movable iron core 10 that slidably reciprocates is inserted into the bobbin 7. One end portion of the movable iron core 10 is brought in or out of contact with the end surface of the cylindrical portion **9*b*. Also, the other end portion of the movable iron core 10 projects externally from the solenoid case 1. An opening spring 11 that urges the movable iron core 10 in a direction where the movable iron core 10 is dissociated from the fixed iron core 9 is disposed between the other end portion of the movable iron core 10** and the solenoid case.

One end portion of the movable iron core 10 is fixed with a rod 12 that extends axially of the movable iron core 10 and reciprocates together with the movable iron core 10. The rod 12 includes a large-diameter portion 12*a* fixed onto the movable iron core 10 and a small-diameter portion 12*b* adjacent to the large-diameter portion 12*a*.

Figure 2:
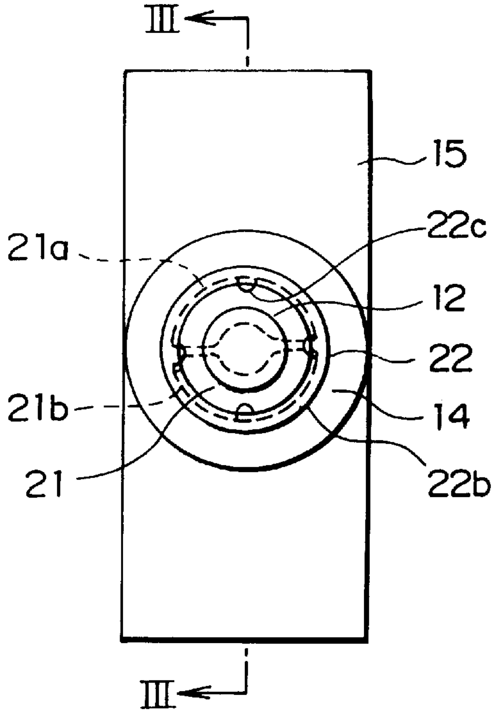
FIG. 2 is a front view showing a leading portion of the rod shown in FIG. 1.
Figure 3:
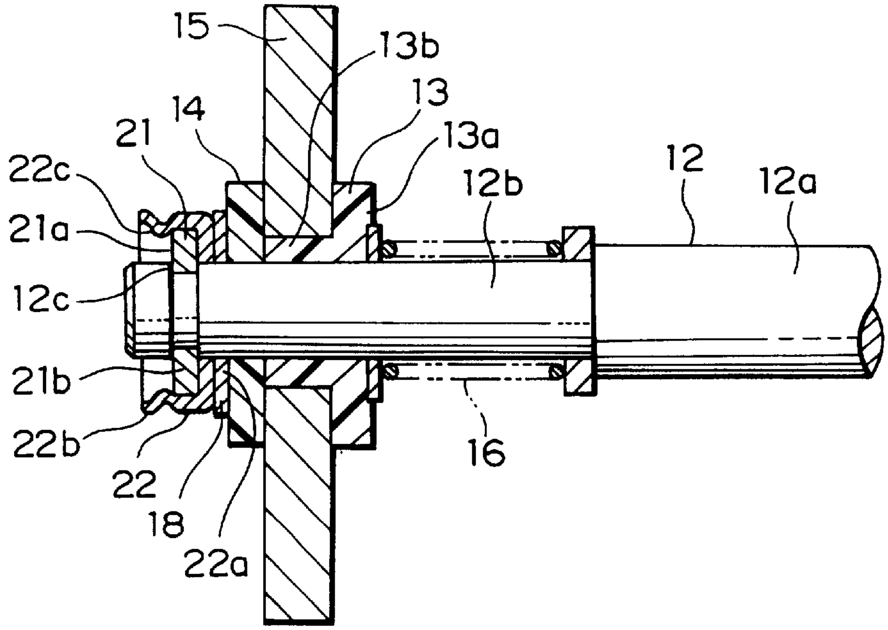
FIG. 3 is a cross-sectional view taken along the line III—III of FIG. 2.

FIG. 2 is a front view showing a leading portion of the rod 12 shown in FIG. 1, and FIG. 3 is a cross-sectional view taken along the line III—III of FIG. 2. The small-diameter portion 12*b* of the rod 12 is equipped with a holding member 13 that can reciprocate in an axial direction of the small-diameter portion 12*b*. The holding member 13 includes a flange portion 13*a* and a cylindrical portion 13*b*. A ring-shaped holding plate 14 is abutted against an end surface of the cylindrical portion 13*b*.

A plate-shaped movable contact 15, which is brought in or out of contact with the pair of fixed contacts 3 and 4, is supported by the rod 12. The movable contact 15 is disposed between the flange portion 13*a* and the holding plate 14. A contact spring 16 that urges the movable contact 15 toward the fixed contacts 3 and 4 is disposed between the large-diameter portion 12*a* of the rod 12 and the holding member 13.

An annular mounting groove 12*c* is defined in the out periphery of the leading portion of a small-diameter portion 12*b*. The mounting groove 12*c* is equipped with a stopper 21 that regulates the movement of a movable contact 15 toward the axial direction of a rod 12. The stopper 21 includes a pair of semicircular pieces 21*a* and 21*b* which are semi-annular and mounted on mounting grooves 12*c* so as to surround the rod 12 in a state where those semicircular pieces 21*a* and 21*b* are opposed to each other. Those semicircular pieces 21*a* and 21*b* are made of a metal that has been hardened by quenching or the like, respectively.

A washer 18 is inserted into the small-diameter portion 12*b* between the stopper 21 and a holding plate 14. A cover 22 is made of metal softer than that of the stopper 21 and inserted into the small diameter portion 12*b* between the washer 18 and the stopper 21. The cover 22 includes a ring portion 22*a* that intervenes between the stopper 21 and the washer 18 and a cylindrical cover body 22*b* that surrounds the stopper 21.

A plurality of projections 22*c* that regulate the relative axial movement of the stopper 21 with respect to the cover 22 are disposed circumferentially at given intervals inside the cover body 22*b*. The projections 22*c* may be formed in continuous rings in circumpherential direction. The projections 22*c* are disposed at positions apart from the ring portion 22*a* by the thickness of the stopper 21 so as to be engaged with the stopper 21.

Next, the operation of the starter magnet switch thus structured will be described.

When a coil 8 is not excited, a movable iron core 10 is dissociated from a fixed iron core 9 due to the spring force of an opening spring 11, and the movable contact 15 is also dissociated from the fixed contacts 3 and 4. For that reason, no current flows between the fixed contacts 3 and 4.

On the other hand, when the coil 8 is excited, the movable iron core 10 is moved against the opening spring 11 leftward in FIG. 1 to abut against the fixed iron core 9. In this situation, the movable contact 15 is moved together with the rod 12 leftward in FIG. 1 to abut against the fixed contacts 3 and 4. As a result, the fixed contacts 3 and 4 are electrically connected to each other through the movable contact 15, and a current flows between the conductors 5 and 6.

Also, because the movable iron core 10 and the rod 12 are moved by a given distance leftward in FIG. 1 even after the movable contact 15 abuts against the fixed contacts 3 and 4, a holding member 13 and the movable contact 15 are moved relatively rightward in FIG. 1 with respect to the rod 12, and a contact spring 16 is compressed As a result, the movable contact 15 is brought in pressure contact with the fixed contacts 3 and 4.

Figure 4:
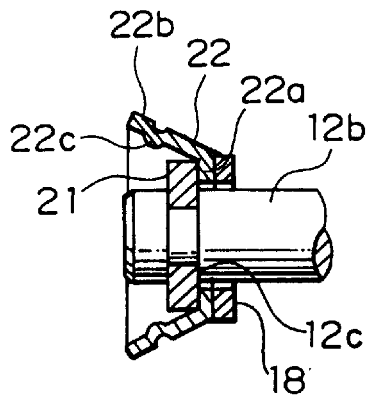
FIG. 4 is a cross-sectional view showing a state after the stopper shown in FIG. 3 is mounted on the leading portion of the rod and before a cover is tightly closed.

Further, the projections 22*c* are formed in advance by pressing the material of the cover 22 or the like before the ring portion 22*a* and the cover body 22*b* are formed. As shown in FIG. 4, when the cover 22 is put on the small-diameter portion 12*b*, the projections 22*c* are not engaged with the stopper 21, and the opening portion of the cover body 22*b* is enlarged. When the outer peripheral portion of the cover body 22*b* is tightly closed after the stopper 21 is mounted on the mounting groove 12*c*, the projections 22*c* are engaged against the stopper 21 as shown in FIG. 3.

In the magnet switch thus structured, the stopper 21 made up of the pair of semicircular pieces 21*a* and 21*b* is used so that the stopper 21 can be prevented from moving radially due to vibrations. As a result, wear and damage of the cover 22 due to contact with the stopper 21 are prevented so that disengagement of the stopper 21 due to damage of the cover 22 can be prevented.

Also, because the relative axial movement of the stopper 21 with respect to the cover 22 is regulated by the projections 22*c*, and the outer peripheral portion of the cover body 22*b* is not enlarged radially, the fixed contacts 3, 4 and the movable contact 15 are prevented from short-circuiting through the cover 22.

Embodiment 2

Figure 5:
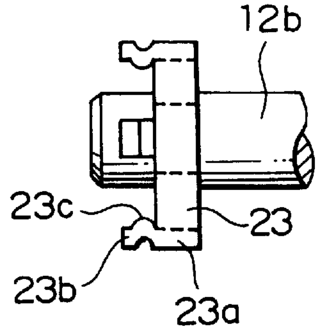
FIG. 5 is a side view showing the main portion of the start magnet switch in accordance with a second embodiment of the present invention.
Figure 6:
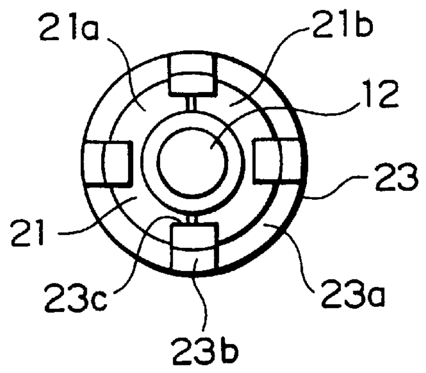
FIG. 6 is a front view showing the rod and cover shown in FIG. 5.

Next, FIG. 5 is a side view showing the main portion of starter magnet switch in accordance with a second embodiment o the present invention, and FIG. 6 is a front view showing the rod and cover shown in FIG. 5. In the figures, a cover 23 includes cylindrical cover body 23*a* that surrounds the stopper 21. The cover body 23*a* is provided with a plurality of extensions 23*b* that are disposed circumferentially at given intervals and extend axially. Each of those extensions 23*b* is provided with a projection 23*c* that regulates the relative axial movement of the stopper 21 with respect to the cover 23. Other structures are identical with those in the first embodiment.

Even with the cover 23 thus structured, the movement of the stopper 21 can be regulated, and the cover 23 can prevent the fixed contacts 3, 4 and the movable contact 15 from short-circuiting.

Embodiment 3

Figure 7:
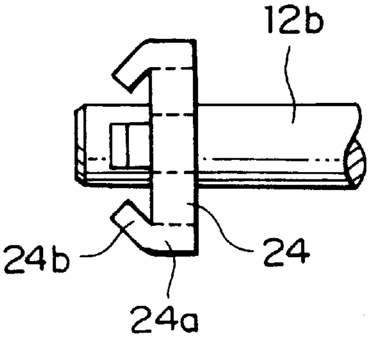
FIG. 7 is a side view showing the main portion of the starter magnet switch in accordance with a third embodiment of the present invention.
Figure 8:
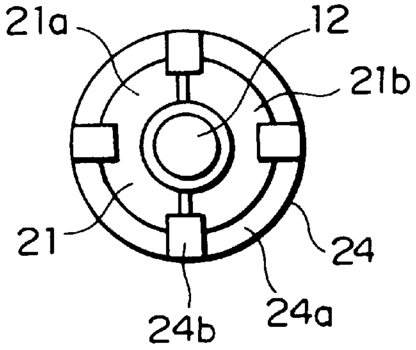
FIG. 8 is a front view showing the rod and cover shown in FIG. 7.

Next, FIG. 7 is a side view showing the main portion of the starter magnet switch in accordance with a third embodiment of the present invention, and FIG. 8 is a front view showing the rod and cover shown in FIG. 7. In the figures, a cover 24 includes a cylindrical cover body 24*a* that surrounds the stopper 21. A plurality of extensions 24*b* that extend obliquely toward the radially inner side are disposed at an end portion of the cover body 24 circumferentially at given intervals. Other structures are identical with those in the first embodiment.

Even with the cover 24 thus structured, the movement of the stopper 21 can be regulated, and the cover 24 can prevent the fixed contacts 3, 4 and the movable contact 15 from short-circuiting.

Embodiment 4

Figure 9:
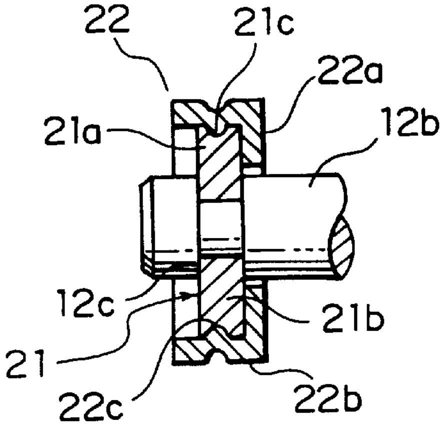
FIG. 9 is a cross-sectional view showing the main portion of the starter magnet switch in accordance with a fourth embodiment of the present invention.

In the first embodiment, the projections 22*c* are engaged with the end surface of the stopper 21. Alternatively, for example, as shown in FIG. 9, recesses 21*c* into which the projections 22*c* are inserted may be defined in the outer peripheral surface of the stopper 21. As a result, the movement of the stopper 21 with respect to the cover 22 can be more surely regulated.

Embodiment 5

Figure 10:
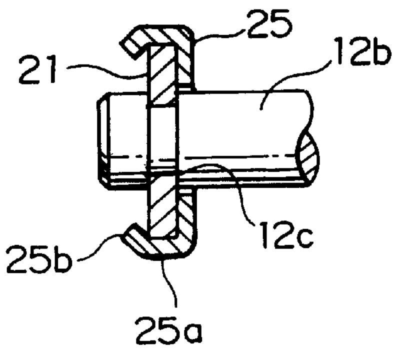
FIG. 10 is a cross-sectional view showing the main portion of the starter magnet switch in accordance with a fifth embodiment of the present invention.
Figure 11:
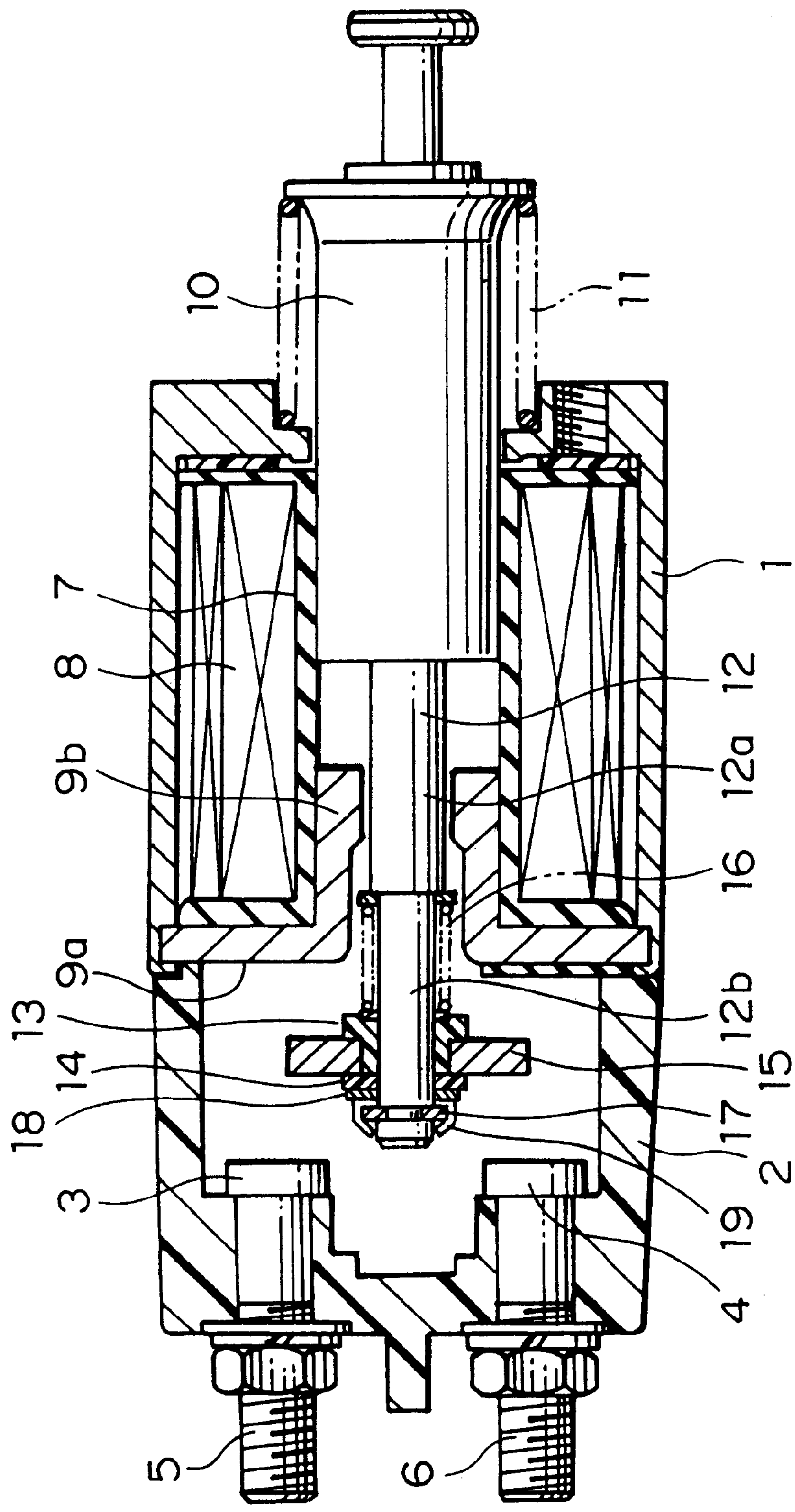
FIG. 11 is a cross-sectional view showing one example of a conventional starter magnet switch.
Figure 12:
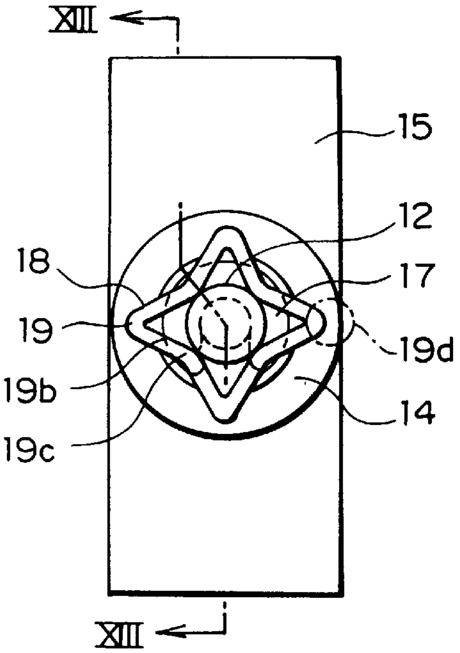
FIG. 12 is a front view showing a leading portion of the rod shown in FIG. 11.
Figure 13:
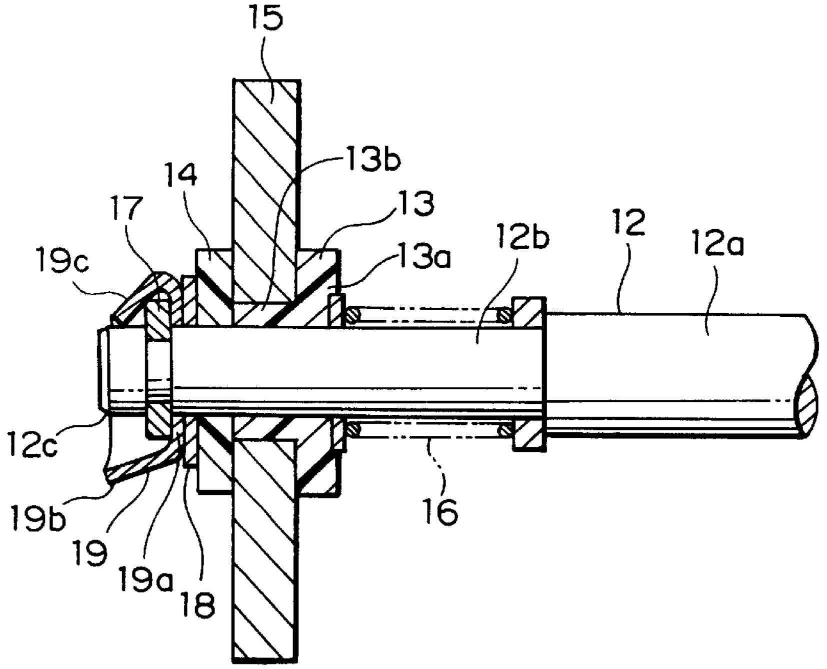
FIG. 13 is a cross-sectional view taken along the line XIII—XIII of FIG. 12.

Next, FIG. 10 is a cross-sectional view showing the main portion of the starter magnet switch in accordance with a fifth embodiment of the present invention. In the figure, a cover 25 includes a cylindrical cover body 25*a* that surrounds the stopper 21. An end portion 25*b* of the cover body 25*a* is subjected to rolling-caulking or the like so that the entire periphery thereof is uniformly bent radially inward. Other structures are identical with those in the first embodiment.

Even with the cover 25 thus structured, the movement of the stopper 21 can be regulated, and the cover 25 can prevent the fixed contacts 3, 4 and the movable contact 15 from short-circuiting.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A starter magnet switch, comprising:

a fixed iron core;

a movable iron core which is allowed to reciprocate in a direction in which said movable iron core is brought in or out of contact with said fixed iron core;

an opening spring which urges said movable iron core in a direction where said movable iron core is dissociated from said fixed iron core;

a coil which moves said movable iron core by excitation in a direction where said movable iron core is brought in contact with said fixed iron core against said opening spring;

a rod which includes an annular mounting groove defined in an outer periphery of a leading portion thereof and reciprocates together with said movable iron core;

a plurality of fixed contacts disposed at given intervals;

a movable contact which is supported by said rod in a state where said movable contact can reciprocate in an axial direction of said rod, which is brought in or out of contact with said fixed contacts by the reciprocation of said rod, and which electrically connects/disconnects said fixed contacts;

a contact spring which is disposed between said rod and said movable contact and urges said movable contact toward said fixed contacts;

a stopper which includes a pair of semicircular pieces which are semi-annular and mounted on said mounting grooves so as to surround said rod in a state where said semicircular pieces are opposed to each other, and which regulates the movement of said movable contact in the axial direction of said rod; and a cover which includes a ring portion disposed between said movable contact and said stopper and a cylindrical cover body that surrounds said stopper, and which prevents said stopper from being disengaged from said rod.

2. The starter magnet switch as claimed in claim 1, wherein a projection that regulates the relative axial movement of said stopper with respect to said cover is disposed inside said cover body.

3. The starter magnet switch as claimed in claim 1, wherein the entire periphery of an end portion of said cover body is uniformly bent radially inward.

4. A starter magnet switch, comprising:

a fixed iron core;

a movable iron core which is allowed to reciprocate in a direction in which said movable iron core is brought in or out of contact with said fixed iron core;

an opening spring which urges said movable iron core in a direction where said movable iron core is dissociated from said fixed iron core;

a coil which moves said movable iron core by excitation in a direction where said movable iron core is brought in contact with said fixed iron core against said opening spring;

a rod which includes an annular mounting groove defined in an outer periphery of a leading portion thereof and reciprocates together with said movable iron core;

a plurality of fixed contacts disposed at given intervals;

a movable contact which is supported by said rod in a state where said movable contact can reciprocate in an axial direction of said rod, which is brought in or out of contact with said fixed contacts by the reciprocation of said rod, and which electrically connects/disconnects said fixed contacts;

a contact spring which is disposed between said rod and said movable contact and urges said movable contact toward said fixed contacts;

a stopper which is mounted on said mounting grooves, and regulates the movement of said movable contact in the axial direction of said rod; and a cover which includes a ring portion disposed between said movable contact and said stopper and a cylindrical cover body that surrounds said stopper, and prevents said stopper from being disengaged from said rod;

wherein projections that regulate the relative axial movement of said stopper with respect to said cover are disposed inside of said cover body.

5. The starter magnet switch as claimed in claim 4, wherein a plurality of extensions are disposed in said cover body to extend axially at mutually spaced circumferential intervals and extend axially, and each of said extensions are provided with said projection.

6. The starter magnet switch as claimed in claim 4, wherein said projections are disposed at an end portion of said cover body at mutually spaced circumferential intervals to extend obliquely radially inward from the end portion of said cover body.

7. The starter magnet switch as claimed in claim 4, wherein recess portions into which said projections are inserted are defined in the outer peripheral surface of said stopper.

8. A starter magnet switch, comprising:

a fixed iron core;

a movable iron core which is allowed to reciprocate in a direction in which said movable iron core is brought in or out of contact with said fixed iron core;

an opening spring which urges said movable iron core in a direction where said movable iron core is dissociated from said fixed iron core;

a coil which moves said movable iron core by excitation in a direction where said movable iron core is brought in contact with said fixed iron core against said opening spring;

a rod which includes an annular mounting groove defined in an outer periphery of a leading portion thereof and reciprocates together with said movable iron core;

a plurality of fixed contacts disposed at given intervals;

a movable contact which is supported by said rod in a state where said movable contact can reciprocate in an axial direction of said rod, which is brought in or out of contact with said fixed contacts by the reciprocation of said rod, and which electrically connects/disconnects said fixed contacts;

a contact spring which is disposed between said rod and said movable contact and urges said movable contact toward said fixed contacts;

a stopper which is mounted on said mounting grooves, and regulates the movement of said movable contact in the axial direction of said rod; and a cover which includes a ring portion disposed between said movable contact and said stopper and a cylindrical cover body that surrounds said stopper, and which prevents said stopper from being disengaged from said rod;

wherein the entire periphery of an end portion of said cover body is uniformly bent radially inward.

9. The starter magnet switch as claimed in claim 4, wherein said stopper includes a pair of semicircular pieces which are semi-annular and mounted on said mounting grooves so as to surround said rod in a state where said semicircular pieces are opposed to each other.

10. The starter magnet switch as claimed in claim 8, wherein said stopper includes a pair of semicircular pieces which are semi-annular and mounted on said mounting grooves so as to surround said rod in a state where said semicircular pieces are opposed to each other.

* * * * *